United States Patent [19]

Brady et al.

[11] 3,943,164
[45] Mar. 9, 1976

[54] POLY(ETHER ESTERS) OF PHTHALIC ACID SALTS AND DI(HALOMETHYL) ETHER

[75] Inventors: Donnie G. Brady; Harold R. Deck; Faber B. Jones, all of Bartlesville, Okla.; John H. Underwood, Charlotte, N.C.

[73] Assignee: Phillips Petroleum Company, Bartlesville, Okla.

[22] Filed: Dec. 5, 1972

[21] Appl. No.: 312,330

Related U.S. Application Data

[62] Division of Ser. No. 153,866, June 16, 1971, Pat. No. 3,716,601.

[52] U.S. Cl. ............................................. 260/475 P
[51] Int. Cl.² ......................................... C07C 69/82
[58] Field of Search .............................. 260/475 P

[56] References Cited
UNITED STATES PATENTS
2,589,688   3/1952   Flory et al. ............................ 260/75

OTHER PUBLICATIONS

Iliceta, "Gazz. Chim. Ital.," 84, pp. 536–551 (1954).
Kovshak, "Izvest. Akad. Nauk S.S.S.R., Otdel. Khim. Nauk.," (1957) pp. 730–736.

*Primary Examiner*—Lorraine A. Weinberger
*Assistant Examiner*—Michael Shippen

[57] ABSTRACT

Poly(ether esters) are prepared by reacting a phthalic acid salt with a di(haloalkyl) ether in a polar solvent using a phosphonium salt catalyst. The resulting poly(ether esters) are useful in olefin polymers to improve dye receptivity.

5 Claims, No Drawings

POLY(ETHER ESTERS) OF PHTHALIC ACID SALTS AND DI(HALOMETHYL) ETHER

CROSS REFERENCE TO RELATED APPLICATION

This is a divisional of my copending application Serial No. 153,866 filed June 16, 1971, now U.S. 3,716,601.

BACKGROUND OF THE INVENTION

This invention relates to novel poly(ether esters).

While virtually any fiber can be dyed to some extent, synthetic fibers having no inherent receptivity require additives to give sufficient dye receptivity to be commercially acceptable. This problem with synthetic fibers is further complicated by the fact that there is great variation from polymer to polymer as to what is or is not effective in improving dye receptivity. Olefin polymers such as polypropylene present the greatest challenge to the dyeing art because of their chemical inertness and general nonpolar character.

SUMMARY OF THE INVENTION

It is an object of this invention to produce novel poly(ether esters); and it is yet a further object of this invention to provide a polyolefin of improved disperse dye receptivity.

In accordance with this invention there is provided poly(ether esters) prepared by reacting a phthalic acid salt with a di(haloalkyl) ether in a polar solvent using a phosphonium salt catalyst.

DESCRIPTION OF THE PREFERRED EMBODIMENTS

The poly(ether esters) of this invention can be made by reacting a phthalic acid salt with a di(haloalkyl) ether in a polar solvent utilizing a phosphonium salt catalyst.

The phthalic acid salt can be either the ortho, meta, or the para. The isophthalic or terephthalic are preferred with the terephthalate being most preferred. The ammonium or any Group I metal salt can be used although the sodium, potassium, lithium, and rubidium salts are preferred. Exemplary salts are dipotassium isophthalate, disodium isophthalate, diammonium terephthalate, dilithium phthalate, dirubidium terephthalate, and the like.

The di(haloalkyl) ether can be represented by the following formula:

$$X-R-O-R^1-X$$

wherein X is a halogen selected from the group consisting of chlorine, bromine, and iodine, preferably chlorine or bromine; and R and $R^1$ are alkylene groups containing 1 to 6 carbon atoms with no branching at the carbon atom to which the halogen atom is attached. Symmetric ethers are preferred wherein R and $R^1$ are identical. Exemplary of suitable ethers are bis(2-bromoethyl) ether, bis(3-chloro-2-methylpropyl) ether, bis(4-chlorobutyl) ether, bis(4-bromo-2-ethylbutyl) ether, and bis(6-chlorohexyl) ether. Also ethers such as 2-chloro-ethyl 4-chlorobutyl ether can be utilized. The preferred ether is bis(chloromethyl) ether.

Any polar organic solvent which is nonreactive under the reaction conditions may be employed as the solvent. The preferred polar solvents are tertiary amides such as N,N-dimethylformamide, N,N-dimethylacetamide, N-methyl-N-phenylformamide, N-methylpyrrolidone, and nitriles such as acetonitrile and propionitrile. Alternatively, an excess of di(haloalkyl) ether can be used as the solvent. The preferred solvent is N,N-dimethylformamide.

The phosphonium catalyst is a quaternary phosphonium salt having the formula $$[R_4{}^2P]_m Y$$

wherein $R^2$ is a hydrocarbyl radical and can be alkyl, cycloalkyl, aryl, or combinations thereof such as aralkyl, alkaryl, and the like, containing from 1 to 8 carbon atoms. The $R^2$ groups within a given phosphonium salt need not all be the same. As an example, the preferred material is ethyltriphenylphosphonium bromide. m is an integer from 1 to 3 and is equal to the valence of Y. Y can be selected from

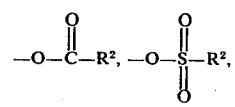

$-F$, $-Cl$, $-Br$, $-CN$, $-OCN$, $-NCO$, $=SO_4$, $-HSO_4$, $=PO_4$, $=HPO_4$, $-H_2PO_4$, $-NO_3$,

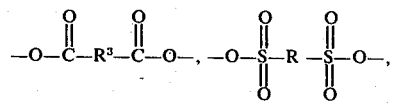

or any other anionic group having a valence of 1 to 3 that is not deleterious to the formation of the poly(ether ester). $R^3$ is like $R^2$ in all respects except that $R^3$ has a valence of 2 and has a range of 6 to 10 carbon atoms. Examples of suitable phosphonium catalysts include tetrabutylphosphonium nitrate, ethyltriphenylphosphonium bromide, p-tolytrimethylphosphonium phosphate, and di(tetrabutyl)phosphonium succinate.

The mole ratio of phthalate salt to di(haloalkyl) ether is preferably about 1:1 to promote development of long polymer chains of poly(ether ester). The mole ratio of phosphonium salt catalyst to phthalate salt should be in the range of 0.01 to 25 moles of phosphonium salt catalyst per 100 moles of phthalate salt, preferably 0.1 to 10 moles of phosphonium salt catalyst per 100 moles of phthalate salt.

The reaction temperature can vary broadly from 20° to 300°C, and the time from about 2 to 6 hours. The weight average molecular weight can vary from 1,000 to 1,000,000, preferably 2,000 to 100,000, more preferably 2,000 to 10,000.

The poly(ether ester) of this invention can be represented by the formula

where R and $R^1$ are alkylene groups containing 1 to 6 carbon atoms as defined above with no branching on the carbon atom attached to the oxygen of the carboxy group, and m is an integer sufficient to give the polymer weight average molecular weight of at least 1,000.

The olefin polymers which can be improved in dye receptivity through incorporation of the poly(ether ester) of this invention include any olefin polymer particularly polymers and copolymers of mono-1-olefins having 2 to 8 carbon atoms per molecule, more preferably polypropylene.

The amount of poly(ether ester) dye receptive agent blended into the polyolefin will generally be in the range of from about 1 to about 25 weight percent based on the weight of the polyolefin, preferably 5 to 15 weight percent. The additive can be incorporated into the polymer in any conventional manner such as mill blending, solution blending and the like. Other conventional additives can be in the olefin polymer such as antioxidants, UV stabilizers, pigments or fillers, foaming agents, and the like.

EXAMPLE I

Synthesis of Poly(2-oxapropyleneterephthalate)

A mixture of dipotassium terephthalate (55.04 g, 0.227 mole) and ethyltriphenylphosphonium bromide (4.0 g, 0.01 mole) in N,N-dimethylformamide (225 ml) was stirred and warmed to 70°C under a nitrogen atmosphere. A solution of freshly distilled bis(chloromethyl) ether (26.1 g, 0.227 mole) in N,N-dimethylformamide (100 ml) was added dropwise to that mixture over 0.5 hour period. The temperature was then raised to and maintained at 100°C for 4 hours, cooled to room temperature and poured into 400 ml of distilled water. The resulting white solid was collected by filtration, air-dried and then washed by slurrying it successively in distilled water, methanol, distilled water, and methanol. The white, powdery product was dried at 120°C in a vacuum over to afford a 43.6 g (92%) yield of poly(2-oxapropyleneterephthalate), m.p. approximately 190°C. The reaction can be depicted as follows:

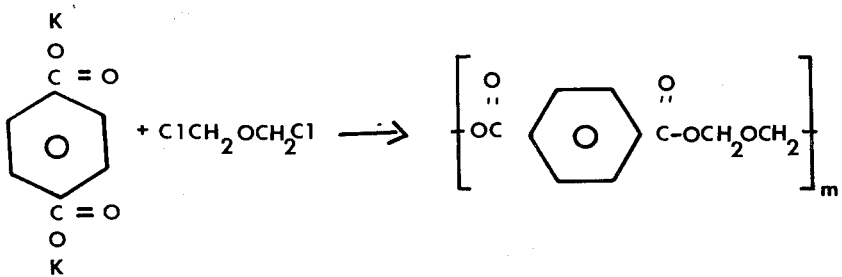

The end groups would, of course, be Cl on the right hand side and K on the left hand side. As noted hereinabove, the di(haloalkyl) ether can be represented by the formula XROR$^1$X wherein X is a halogen selected from the group consisting of chlorine, bromine, and iodine. The phthalic acid salt can be an ammonium salt or any Group I metal salt which ammonium or Group I metal can be represented by M. Thus the polymer including end groups can be represented by the following formula:

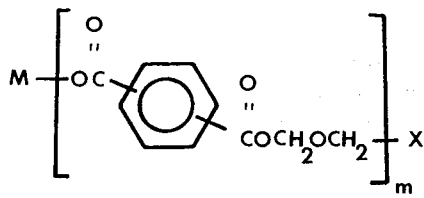

wherein M is selected from ammonium and Group I metals and X is selected from chlorine, bromine, and iodine and m is an integer sufficient to give the poly a weight average molecular weight of at least 1000.

EXAMPLE II

The poly(ether ester) of Example I was tested as a dye receptive agent in the following composition:

TABLE I

|  | g |
| --- | --- |
| 12 melt flow polypropylene fluff | 500.00 |
| 10 php Poly(ether ester) of Example | 50.00 |
| 0.05 php 2,6-di-tert-butyl-4-methylphenol | 0.25 |
| 0.1 php Irganox 1093* | 0.50 |
| 0.25 php distearylthiodipropionate | 1.25 |
| 0.50 php Tinuvin 328** | 2.50 |
|  | 554.50 |

*A phenolic antioxidant
**A benzotriazole type ultraviolet stabilizer

The above composition was pelletized, spun, drawn (2.5:1), knit into a sock and the spin finish was removed. Six inch samples of knit were dyed (2.0% on weight of fiber).

The dyeing procedure involved using a dye solution (2% dye, 2% Dupanol RA, which is an alcohol ether sodium sulfate anionic textile detergent, 40:1 liquor ratio) at 205°–210°F into which the sock was repeatedly lowered, raised, and relowered for 1 hr. Following rinse and after-scour (15 minutes repeatedly lowering, raising and relowering into a bath of 130°F containing 2% of anionic surfactant), the sock was dried and examined. The results are tabulated below.

TABLE II

| Sample | Dye[1] | Color Yield[2] | Light Fastness[3] | Dry Cleaning[4] |
| --- | --- | --- | --- | --- |
| Unmod. PP[5] | A | 3.1 | 2/5 | 0 |
| Mod. PP[6] | A | 5.1 | 4/40 | 1–2 |
| Unmod. PP | B | 2.6 | 2/5 | 0 |
| Mod. PP | B | 5.1 | 4/20 | 2 |
| Unmod. PP | C | 1.3 | 2/5 | 0 |
| Mod. PP | C | 3.3 | 4/40 | 2 |

[1]A = Genacron Blue GR, B - Polydye Red BC, C - Calcosyn Yellow GCN; (all dyes employed at 2 wt. % on fiber).
[2]Determined by "IDL Color Eye" (the higher the number, the deeper the color).
[3]An AATCC standard test (exposure in Weatherometer: the higher the "numerator," the more intense the remaining color; the "denominator" equals the number of hours to appreciable failure).
[4]An AATCC standard test ("0" denotes total loss of color, "5" would denote full retention of color).
[5]Unmodified polypropylene (no dye receptor).
[6]Modified polypropylene (composition shown in Table I).

The value of poly(2-oxapropyleneterephthalate) as a dye receptor is clearly shown in Table II with all dyes in all tests by the superiority of the modified over the unmodified samples.

While this invention has been described in detail for the purpose of illustration, it is not to be construed as limited thereby but is intended to cover all changes and modifications within the spirit and scope thereof.

We claim:

1. A poly(ether ester) consisting essentially of repeating units as represented by the formula

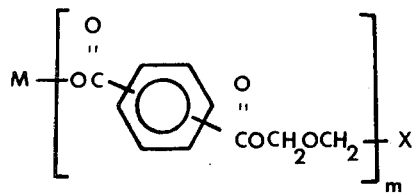

wherein m is an integer sufficient to give said poly(ether ester) a weight average molecular weight of at least 1000, M is selected from ammonium and Group I metals and X is selected from chlorine, bromine, and iodine.

2. A composition according to claim 1 wherein said poly(ether ester) has a weight average molecular weight within the range of 2,000 to 10,000.

3. A composition according to claim 1 wherein M is K and X is Cl.

4. A composition according to claim 2 wherein M is K and X is Cl.

5. A composition according to claim 4 wherein the bonds to the ring are in the para position.

* * * * *